(12) United States Patent
Roth

(10) Patent No.: US 8,234,725 B2
(45) Date of Patent: Aug. 7, 2012

(54) HANDLE ARRANGEMENT

(76) Inventor: Eckart Roth, Altensteig (DE)

( * ) Notice: Subject to any disclaimer, the term of this patent is extended or adjusted under 35 U.S.C. 154(b) by 270 days.

(21) Appl. No.: 12/452,064

(22) PCT Filed: Jun. 6, 2008

(86) PCT No.: PCT/EP2008/004518
§ 371 (c)(1),
(2), (4) Date: Dec. 11, 2009

(87) PCT Pub. No.: WO2008/151761
PCT Pub. Date: Dec. 18, 2008

(65) Prior Publication Data
US 2010/0146697 A1    Jun. 17, 2010

(30) Foreign Application Priority Data
Jun. 15, 2007  (DE) .............. 20 2007 008 376 U

(51) Int. Cl.
*A47K 3/022* (2006.01)
(52) U.S. Cl. ............................................. 4/577.1
(58) Field of Classification Search .............. 4/577.1, 4/538, 571.1
See application file for complete search history.

(56) References Cited

U.S. PATENT DOCUMENTS

| 5,190,332 A | 3/1993 | Nagai et al. |
| 7,603,728 B2 | 10/2009 | Roth |
| 2005/0257346 A1 | 11/2005 | Roth |

FOREIGN PATENT DOCUMENTS

| DE | 1 806 451 A | 10/1969 |
| DE | 41 28 659 A1 | 3/1992 |
| DE | 299 08 455 U1 | 10/1999 |
| DE | 200 14 971 U1 | 2/2001 |
| DE | 10 2004 021 986 B3 | 6/2005 |
| DE | 20 2006 018 981 U1 | 5/2007 |
| DK | 1806451 A1 * | 10/1969 |

(Continued)

OTHER PUBLICATIONS

German Patent Office Search Report dated Jan. 21, 2008 (4 pages).

(Continued)

*Primary Examiner* — Lori Baker
(74) *Attorney, Agent, or Firm* — Flynn, Thiel, Boutell & Tanis, P.C.

(57) ABSTRACT

In a handle arrangement, in particular an aid to help persons rise, for example in the bathroom area, having a gripping rod (12), on which at least one suction head (14) with a suction plate (15) or a suction piston (50) and an actuating device (17) for the suction plate (15), or respectively suction piston (50), are arranged on at least one handle end (13a, 13b), or between both handle ends (13a, 13b), so that the at least one suction head (14) can be attached by suction to a porous surface by activating the actuating device (17) for forming a vacuum acting between the porous surface and the suction plate (15), or respectively the suction piston (50), and can be released therefrom by releasing the vacuum, a vacuum loss indicator device (22) is provided, which reacts to the reduction of the vacuum.

13 Claims, 11 Drawing Sheets

FOREIGN PATENT DOCUMENTS

| | | | |
|---|---|---|---|
| DK | 20014971 | U1 * | 12/2000 |
| DK | 102004021986 | B3 * | 6/2005 |
| EP | 1 183 981 | A2 | 3/2002 |
| EP | WO2007/033830 | A * | 3/2007 |
| EP | 1 816 094 | A1 | 8/2007 |
| EP | 1 826 160 | A1 | 8/2007 |
| WO | WO 2007/033830 | A1 | 3/2007 |

OTHER PUBLICATIONS

Form PCT/ISA/220, Apr. 5, 2009.
Form PCT/ISA/210, Apr. 5, 2009.
Form PCT/ISA/237, Dec. 11, 2009.
Form PCT/IB/301, Jul. 21, 2008.

* cited by examiner

HANDLE ARRANGEMENT

BACKGROUND OF THE INVENTION

The invention relates to a handle arrangement, in particular to an aid to help persons rise, for example in the bathroom area, having a gripping rod, on which at least one suction head with a suction plate or a suction piston and an actuating device for the suction plate, or respectively suction piston, are arranged on at least one handle end, or between both handle ends, so that the at least one suction head can be attached by suction to a porous surface by activating the actuating device for forming a vacuum acting between the porous surface and the suction plate, or respectively the suction piston, and can be released therefrom by releasing the vacuum.

DESCRIPTION OF THE PRIOR ART

Elderly or disabled persons must hold on to something, in particular when rising, but also when sitting down or standing. This applies in particular in the bathroom area when using the toilet, a wash basin, a shower or a bathtub. Customarily, fixed handholds are installed for this. However, handle arrangements of the type mentioned at the outset, which are not unchangeably fixedly mounted, but can be employed in case of need wherever a fixedly fastened handle is lacking, are already available in commerce. The only requirement is that a particularly flat surface be available which tightly seals the suction plate in the mounted state.

Thus, for example, a handle arrangement of the type mentioned at the outset is disclosed in EP 1 183 981, having a gripping rod, on each of whose two respective end areas a suction head is fastened which, by means of an actuating device, can be connected by suction with a flat surface, for example on tiles, and can be released from there. When operating the actuating device, the rubberized/elastic suction plate is pulled upward away from the flat surface, so that it is placed into an effective position by a vacuum being created between the flat surface and the suction plate. By opening the actuating device, this vacuum is released again, and the suction head can again be pulled away from the flat surface.

It often is the case that such handle arrangements are held by suction on a flat surface for an extended time. In the course of this it may happen that the vacuum is reduced over time, for example by diffusion. Although as a rule, with a residual vacuum, the handle device does not become released from the flat surface on its own, in case of vacuum loss the desired holding force to be provided by the handle arrangement is reduced. In the course of this it can occur that persons, trusting a handle arrangement to be dependably secured by suction, hold on to it, but that, because of the holding force having been reduced by the vacuum loss, the handle arrangement suddenly comes loose from the flat surface. Accidents can occur because of this.

SUMMARY OF THE INVENTION

It is the object of the invention to create a handle arrangement of the type mentioned at the outset, which can be dependably applied to a flat surface by suction and by means of which it is possible to avoid the above mentioned problems occurring because of vacuum loss.

This object is attained by a handle arrangement having the characteristics of independent claim 1. Further developments of the invention are represented in the dependent claims.

The device in accordance with the invention is characterized by a vacuum loss indicator device being provided, which responds to the reduction of the vacuum.

The user is thus advised of the reduction of the vacuum, or respectively of a vacuum loss, so that he is warned and does not support himself by such a handle arrangement no longer dependably attached by suction. By means of this, accidents due to a handle arrangement suddenly being released from the flat surface are avoided. Moreover, the user is provided with information to the effect that he needs to place and clamp the handle arrangement again in order to recreate a vacuum which assures the desired holding force.

In a further development of the invention, the vacuum loss indicator device has at least one indicator element, in particular mechanically actuable, which can be moved by means of a change in the vacuum between a basic position corresponding to a sufficient vacuum for the desired holding force of the handle arrangement, and at least one loss-indicating position, signaling a reduction of the vacuum. Thus, in the loss-indicating position the indicator element can assume a position which can be clearly noticed by the user. The position of the indicator element "catches the eye" of the user, so to speak. In order to still increase this noticeability, in the loss-indicating position the indicator element can have a visible colored caution marking, in particular red, yellowish-orange, and/or designed as a logo or writing, and/or cross-hatched.

Alternatively to an indicator element which, in particular, is operated mechanically, the employment of an electrically operated indicator element would basically be possible, for example a light turned on in case of a vacuum loss, in particular an LED. An acoustical signal element would also be conceivable which, in case of a vacuum loss, outputs at least a sound, for example a continuous sound or continuous sounds, and/or a noise, for example a snapping noise.

In a particularly preferred way, in its basic position the indicator element is not housed in a visible way in the suction head. Thus, it can only emerge from the suction head when the vacuum is reduced, so that then it attracts attention. However, in principle it would also be conceivable for the indicator element to be already visible in its basic position, however, in that case it would have to be assured that this basic position clearly signals to the user that the vacuum is still okay, so to speak. This can take place for example by means of a marking or position of the indicator element which signals a clear "vacuum OK", for example by means of a green or other, for example, yellow signal color, and/or a retracted or lowered position of rest of the indicator element. A signaling effect preferably occurs when the intended holding force of the handle device is reduced. This can take place, for example, when the vacuum is reduced by 50%.

As the rule, the reduction of the vacuum takes place relatively slowly. If the indicator element were coupled with this slow reduction of the vacuum, the indicator element would also wander slowly from its basic position to one of the loss indicator positions. The indicator element can then wander from one loss indicator position into the next, for example could extent farther and farther out of the housing of the suction head, until finally the loss indicator end position has been reached, from which the indicator element cannot be further moved. There is the danger that, even though the user notices the indicator element, in case the loss indicator end position has not yet been reached, he could think that although the vacuum has been reduced, it is not yet so critical that holding on to the handle device would be dangerous. It is therefore, of advantage if in case of a reduction of the vacuum the indicator element can be moved from its basic position rapidly, in particular suddenly, without stopping in an intermediate position, into a loss indicator end position.

It is particularly advantageous if, in case an increased safety reserve of a vacuum has not been attained or is possibly creepingly lost, the indicator element can be quickly moved, in particular suddenly and without lingering in a possibly further worsening intermediate position, from its indicator position, which is in this state, into the loss indicator end position. Thus, in this case the indicator element is most likely in its clearly visible loss indicator end position, so that the previously mentioned creeping change is not continued and therefore misunderstandings are made impossible.

In a further development of the invention, the indicator element is coupled with the suction plate or the suction piston by coupling means.

The coupling means can have a diaphragm, in particular a rubber-elastic one, fastened to the suction plate or to the suction piston and movable by a change in the vacuum.

It is alternatively possible that the coupling means have a bolt, connected at one end with the suction plate or the suction piston and on the other end with the indicator element, and a spring element coupled with the indicator element, whose spring force acts counter to the vacuum force exerted by the vacuum in the direction of the flat surface. Thus, the resilient force and the vacuum force can act in opposite directions, because of which, when the vacuum decreases, the indicator element can be moved into the loss indicator position by means of the spring force of the spring element.

It is possible for the indicator element and the bolt to be relatively immovably connected with each other and, when the vacuum is decreased, the suction plate or the suction piston, the bolt and the indicator element can be lifted by the resilient force of the spring in a direction away from the flat surface, because of which the indicator element attains its loss indicator position.

Alternatively it is possible for the indicator element and the bolt to be movable relatively to each other and to be held against each other by static friction generated by the vacuum force, so that, when the vacuum is reduced, the static friction can be overcome by means of the resilient force of the spring element acting perpendicularly to the direction of the vacuum force, because of which the indicator element takes up its loss indicator position.

In a further development of the invention, the actuating device has an actuating tappet fastened to the suction plate or to the suction piston, which projects out of the housing of the suction head and is connected via a hinged shaft with an eccentrically designed actuating lever, which can be pivoted between an opening position and a closing position, so that in the closing position the actuating tappet and the suction plate, or respectively the suction piston, are lifted, based on the eccentricity of the actuating lever, and a vacuum is thus created.

In connection with a further development of the invention, at least one suction head is respectively seated at both ends of the gripping rod or along a gripping rail. At least one indicator element of the vacuum loss indicator device can be assigned to each one of these suction heads.

The suction plate usefully is made of a rubber-elastic material. The suction piston preferably consists of a rigid material, or is resiliently embodied in such a way that an automatic regulation of the tension then achieves the safety reserve range again.

BRIEF DESCRIPTION OF THE DRAWINGS

Preferred exemplary embodiments of the invention are represented in the drawings and will be explained in greater detail in what follows. Shown in the drawings are in.

DETAILED DESCRIPTION OF THE INVENTION

Figure 1:
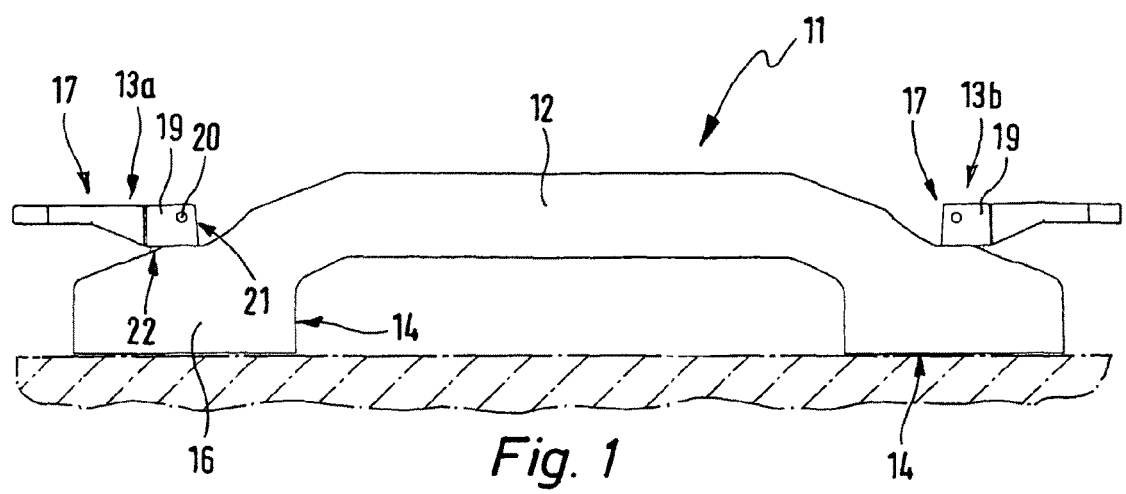
FIG. 1, a lateral view of a first exemplary embodiment of the handle arrangement of the invention, having a sufficient vacuum, FIG. 2, the handle arrangement of FIG. 1 in case of a vacuum loss, FIG. 3, an enlarged representation of one of the handle ends of the handle arrangement of FIG. 1, FIG. 4, a view from above onto the handle end of FIG. 3, FIG. 5, a longitudinal section through the handle arrangement of FIG. 4 along the line V-V in FIG. 4, FIG. 6, an enlarged representation of one of the handle ends of the handle arrangement of FIG. 2, FIG. 7, a view from above on the handle end of FIG. 6, FIG. 8, a longitudinal section through the handle arrangement of FIG. 7 along the line VIII-VIII in FIG. 7, FIG. 9, a lateral view of a second exemplary embodiment of the handle arrangement of the invention, having a sufficient vacuum, FIG. 10, the handle arrangement of FIG. 9 in case of a vacuum loss, FIG. 11, a cross section through a suction head of the handle arrangement of FIG. 9 along the line XI-XI in FIG. 9, FIG. 12, a cross section through a suction head of the handle arrangement of FIG. 10 along the line XII-XII in FIG. 10, FIG. 13, a view from above on a third exemplary embodiment of the handle arrangement in accordance with the invention, having a sufficient vacuum, FIG. 14, the handle arrangement of FIG. 12 in case of a vacuum loss, FIG. 15, a lateral view of one of the suction heads of the handle arrangement of FIG. 13 in an enlarged view, FIG. 16, a lateral view of one of the suction heads of the handle arrangement of FIG. 14 in an enlarged view, FIG. 17, a longitudinal sectional view through the suction head of the handle arrangement of FIG. 13 along a line XVII-XVII in FIG. 13, and FIG. 18, a longitudinal sectional view through the suction head of the handle arrangement of FIG. 14 along a line XVIII-XVIII in FIG. 14, FIG. 19, a handle arrangement according to a third embodiment of a handle arrangement of the present invention, FIG. 20, the handle arrangement of FIG. 19 in case of a vacuum loss, FIG. 21, an embodiment of an indicator element of the vacuum loss indicator device being in the basic position, FIG. 22, the indicator element of FIG. 21 in the loss indicator position, FIG. 23, a further embodiment of an indicator element of the vacuum loss indicator device being in the basic position, FIG. 24, the indicator element of FIG. 23 in the loss indicator position, FIG. 25, a further embodiment of an indicator element of the vacuum loss indicator device being in the basic position, FIG. 26, the indicator element of FIG. 25 in the loss indicator position, FIG. 27, a further embodiment of an indicator element of the vacuum loss indicator device being in the basic position, and FIG. 28, the indicator element of FIG. 27 in the loss indicator position.

FIGS. 1 to 8 represent a first exemplary embodiment of the handle arrangement 11 in accordance with the invention. It has a gripping rod 12, on which at least one suction head 14 is arranged on at least one handle end 13a, 13b, or along the gripping rod 12, and can be fixed by suction to a flat surface, such as constituted by tiles, for example.

In accordance with the first exemplary embodiment, respectively one suction head 14 is provided on both handle ends 13a, 13b of the gripping rod 12. In accordance with a first alternative, the suction head 14 has a suction plate 15 (in a dash-dotted representation in FIG. 8), which is made of a rubber-like flexible material and is arranged on the underside of the suction head 14. Above the suction plate 15, the suction head housing 16 contains a hollow chamber, up into which the central area of the suction plate 15 can preferably be pulled. In the course of the pull-up, the outer area of the suction plate 15 is supported on the underside of the suction head housing 16. An actuating device 17 is assigned to the suction plate 15, by means of which the suction plate 15 can be displaced between an ineffective and an effective position. In the ineffective position the suction plate 15 rests loosely on the suction head housing 16 and is unstressed in the direction toward the suction, head housing 16. But in the effective position of the actuating device 15 the suction plate 15 has been pulled up toward the suction head housing 16. Because of this, a vacuum is created between the flat surface and the suction plate. In accordance with a second alternative, a suction piston 50 (FIGS. 5 and 8) is displaceably conducted in the hollow chamber of the suction head 14. Preferably the suction piston 50 and the actuating tappet 18, which could also be called a piston rod, are connected in one piece with each other. The suction piston 50 consists of a rigid material, for example a hard plastic material. The suction piston 50 is sealed against the interior wall of the hollow chamber by at least one seal 55. It is for example possible to provide a seal ring, fastened on the circumference of the suction piston 50. Moreover, a sealing lip 60 (FIG. 5) is located on the underside of the suction piston 50 for sealing the suction head 14 against the flat surface.

The actuating device 17 preferably acts on the center of the suction plate 15. For example, the actuating device 17 contains an actuating tappet 18, fastened on the suction plate 15 and extending upward therefrom, which passes through the hollow chamber of the suction head housing 16 arranged above the suction plate 15 and projects on the upper side opposite the suction plate 15 out of the suction head housing 16, where an actuating lever 19 is hinged to the bolt and has an eccentric part 21 in the external area of the hinged shaft 20, which is supported on a support face. In the ineffective position the area of the eccentric part 21 closer to the hinged shaft 20 rests against the support face, so that the suction plate 15 is relieved. If the actuating lever 19 is pivoted out of the ineffective position (not represented) into the effective position represented in FIGS. 1 to 3 and 6, the area of the eccentric part 21 remote from the hinged shaft 20 rests on the support surface and is supported there, so that the suction plate 15 assumes its pulled-up position. A restoring spring (not represented) also acts on the suction plate which, in the course of pivoting the actuating lever 19, moves it back out of the effective position into the ineffective position into its initial position. For example, the restoring spring can be constituted by a helical spring extending around the actuating tappet 18, which is supported by its end opposite the suction plate 15 on the inside of the suction head housing 16.

The handle arrangement 11 has a vacuum loss indicator device 22, which reacts to a lowering, or respectively reduction of the vacuum. The vacuum loss indicator device 22 has a mechanically actuated indicator element 23, which can be moved by means of a vacuum change between a basic position 24 corresponding to a sufficient vacuum for the desired holding force of the handle arrangement 11, and at least one loss indicator position 25 indicating a reduction of the vacuum.

In accordance with a first exemplary embodiment, a cylinder-like plug is provided as the indicator element 23, which has been inserted into a receiving opening 26, preferably located centered in the top of the suction head housing 16. The plug-like indicator element 23 has a head section 27, whose diameter is greater in comparison with the rest and is provided with a colored, in particular red or red-orange caution marking. The top of the head section 27 simultaneously constitutes the support surface for the actuating lever 19.

The plug-like indicator element 23 is connected by coupling means with the suction plate 15, or respectively the suction piston 50. A bolt, which in this case is constituted by the actuating tappet 18 of the actuating device 17, is counted among the coupling means. The bolt, or respectively actuating tappet 18, extends through the receiving opening 26 and projects out of the suction head housing 16 at the side opposite the suction plate, or respectively the suction piston. The actuating tappet 18 is relatively immovably connected with the plug-like indicator element 23. Furthermore, a spring element 28 is among the coupling means and has also been inserted into the receiving opening 26, and on one end is supported in place on the underside of the receiving opening, while it presses with the other end against the underside of the plug-like indicator element 23. Thus, the resilient force of the spring element 28 acts upwardly/outwardly away from the flat surface and therefore in opposition to the vacuum force acting in the direction toward the flat surface of the vacuum formed in the state in which the handle arrangement is fixed in place by suction.

Figure 3:
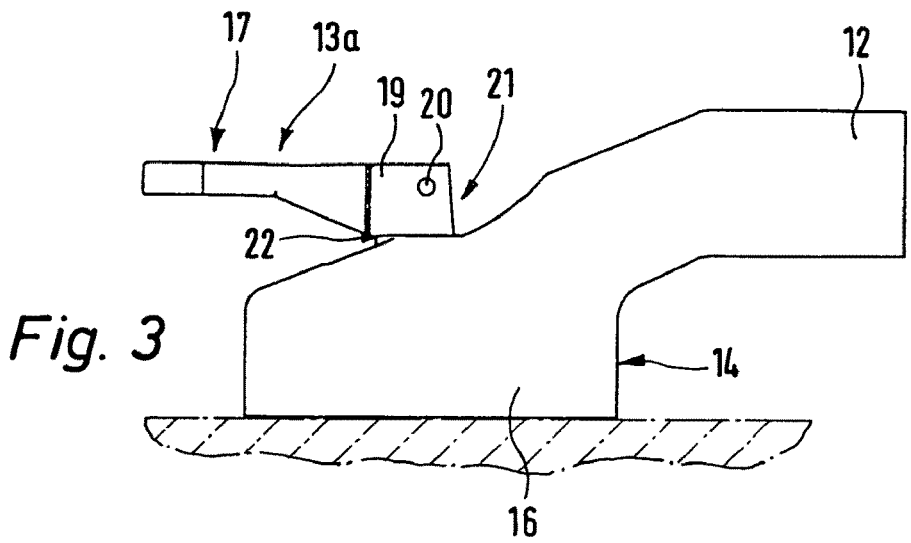
Figure 4:
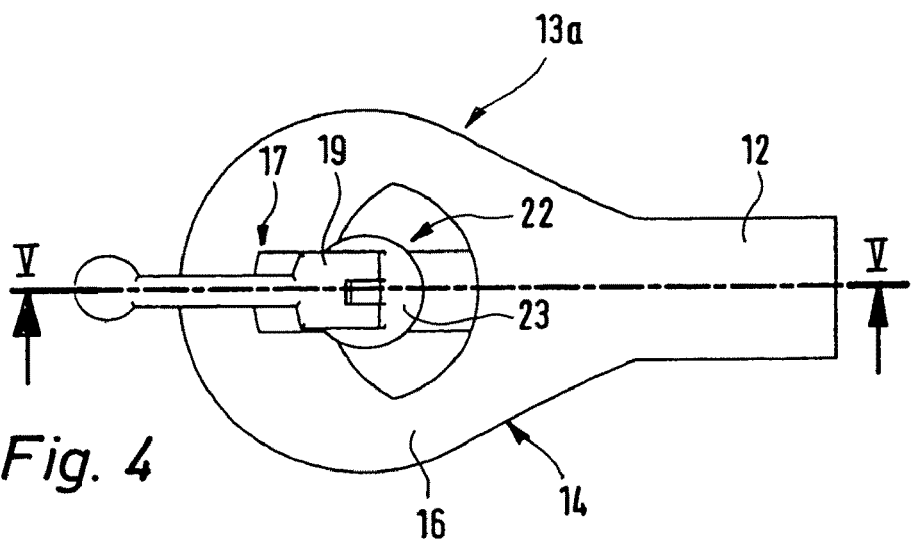
Figure 5:
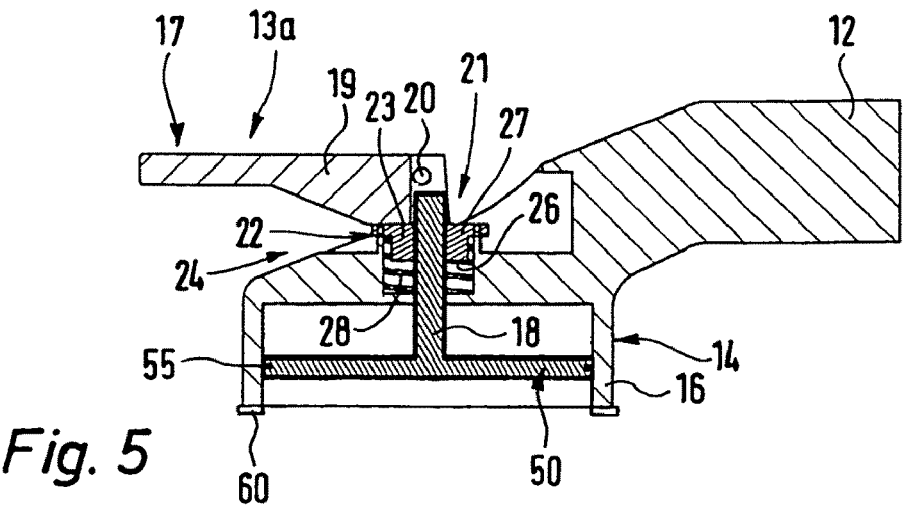

If the handle arrangement 11 is fixed in place by suction on a flat surface, for example on tiles, and a sufficient vacuum exists for the desired holding force of the handle arrangement 11, the plug-like indicator element 23 of the vacuum loss indicator device 22 assumes the basic position represented in FIGS. 1, 3 and 5. In this case the vacuum force is so great that it pulls the actuating tappet 18 and the plug-like indicator element 23 downward far enough against the resilient force of the spring element 28 so that the extensible head section 27 marked in red has been retracted into the suction head housing 16 so that it is not visible.

Otherwise, a part projecting forward over the front of the suction head could signal a vacuum force, and is retracted as soon as the vacuum no longer provides the required vacuum force. This could for example be a rubber damper with green marking, which is easily visible in case of a sufficient vacuum, but is covered and not visible when the vacuum is reduced.

Figure 2:
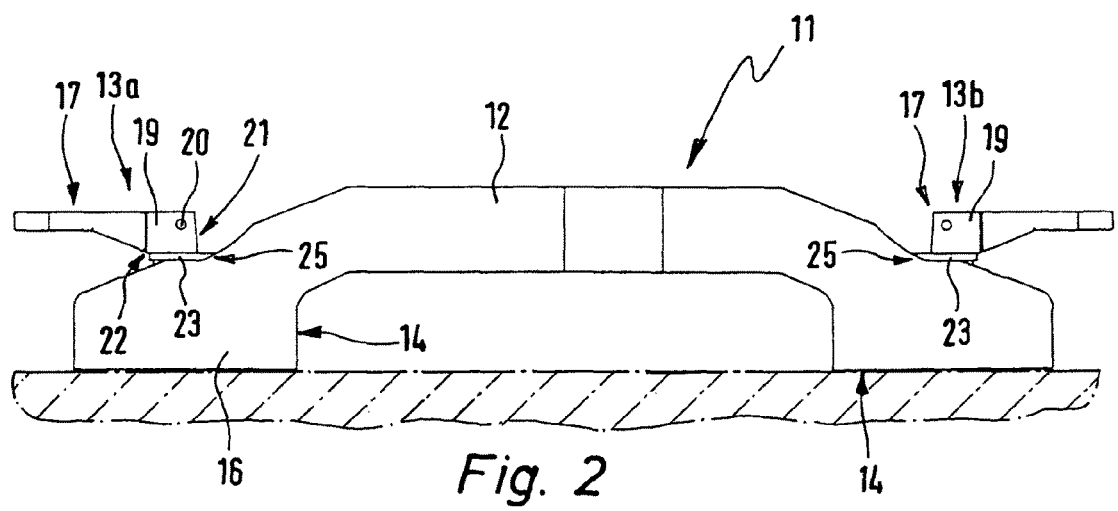
Figure 6:
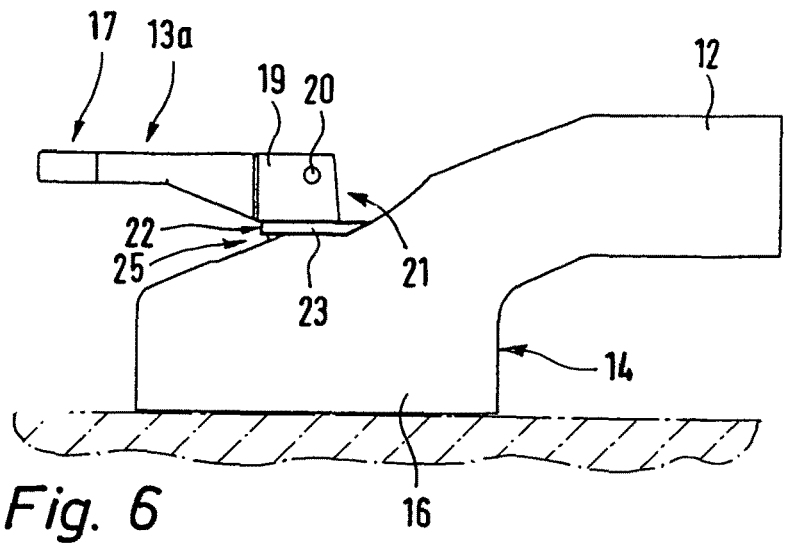
Figure 7:
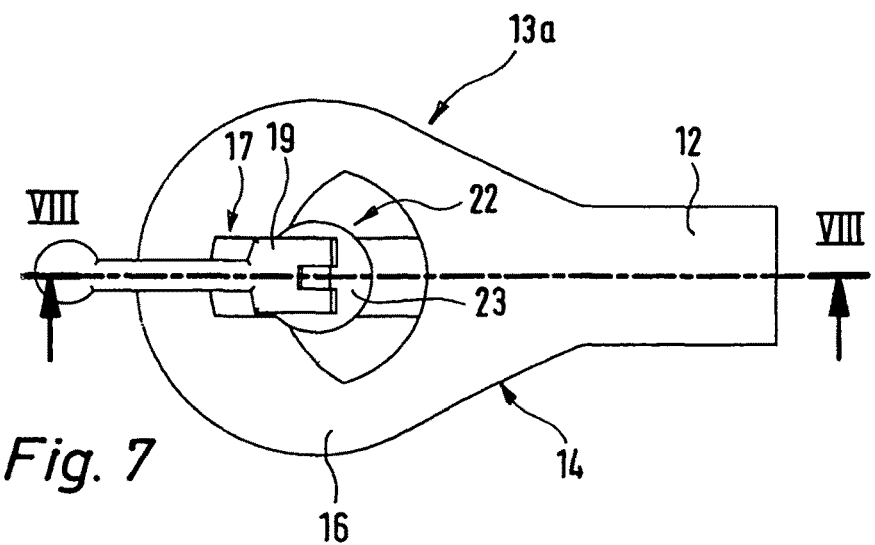
Figure 8:
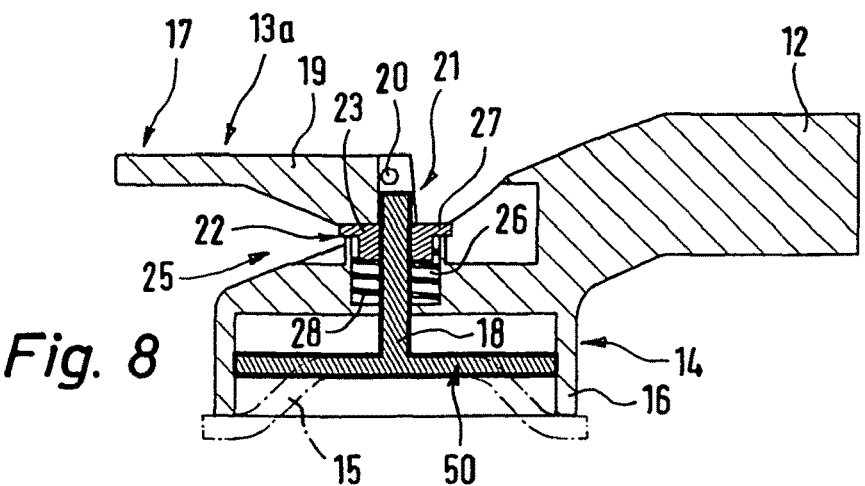

If over time the vacuum is reduced, i.e. if a vacuum loss occurs, the force exerted by the vacuum in the direction of the flat surface is also reduced, so that the resilient force of the spring element 28 pushes the suction plate 15, or respectively the suction piston 50, the actuating tappet 18 fastened thereon, and the plug-like indicator element 23 upward, so that the head section 27, marked in red, of the plug-like indicator element 23 moves into its loss indicator position 25. In the process, the head section 27 with the caution marking rises out of the suction head housing 16, so that it becomes clearly visible to the user. This state is represented in FIGS. 2, 6 and 8. In addition, the spring travel counteracts the waning vacuum pulling force and an extended constant vacuum force is achieved in this way.

In addition, the vacuum loss indicator device 22 comprises an indicator element 23 assigned to the suction head 14 located at the opposite other handle end 13b. The arrangements, or respectively modes of functioning, are identical at all suction heads, so that the vacuum of the one suction head is of course created independently of a vacuum of another suction head.

A second exemplary embodiment of the handle arrangement 11 is represented in FIGS. 9 to 12.

Here, too, the vacuum loss indicator device 22 has an indicator element 23 which, however, is here embodied as an indicator pin.

The indicator element 23, here for example pin-like, is movably conducted in a preferably cylindrical pin opening 29 extending from the top of the suction head housing 16 as far as into the hollow chamber. On its underside, the pin-like indicator element 23 is connected with coupling elements in the form of a rubber-elastic diaphragm 30. In turn, the rubber-elastic diaphragm 30 has been inserted into a cut-through in the suction plate 15 and it moves in case of a change in the vacuum.

Figure 9:
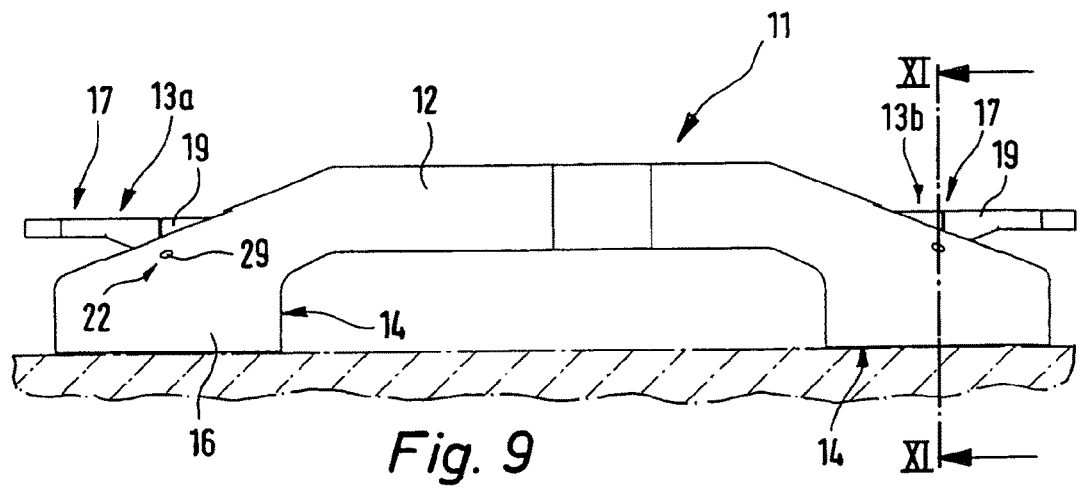
Figure 10:
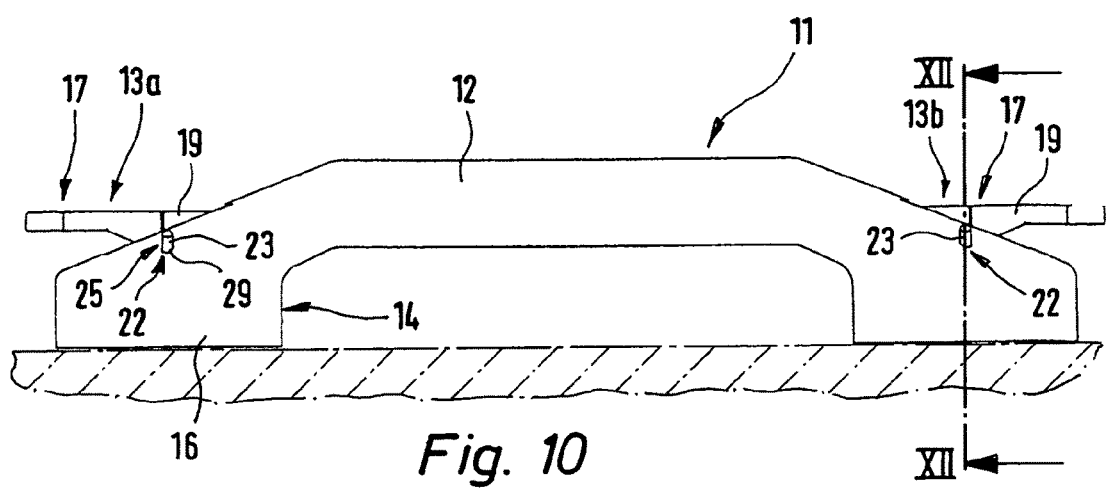
Figure 11:
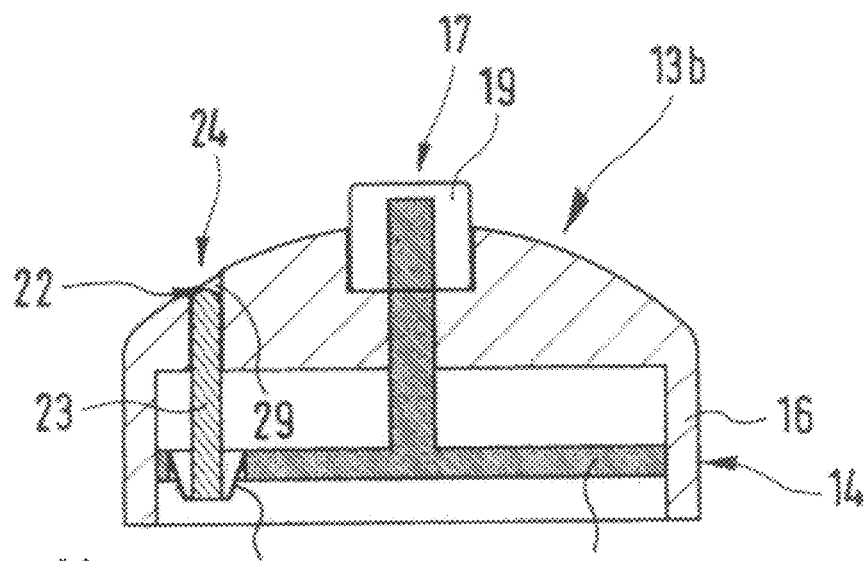
Figure 12:
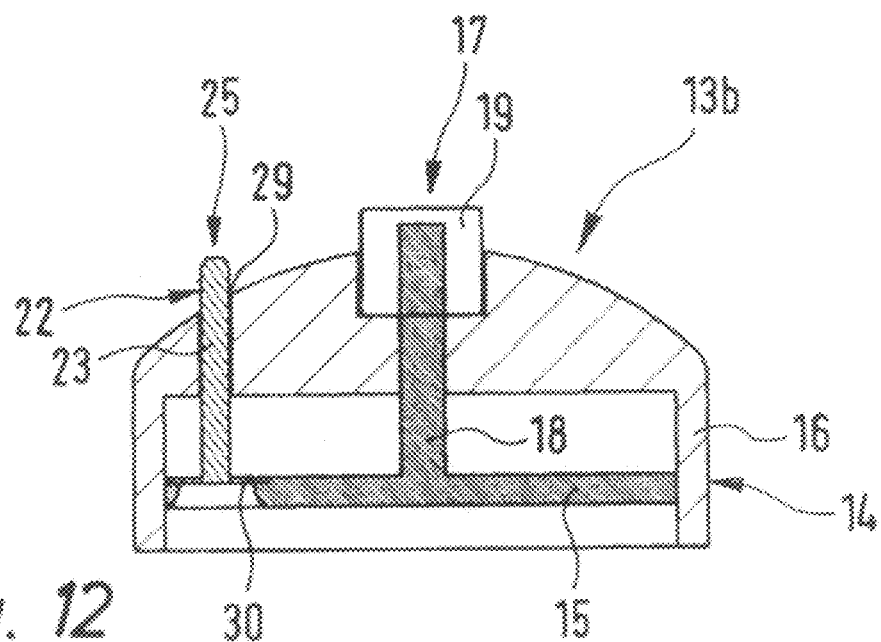

If the vacuum is sufficiently strong, the pin-like indicator element 23 assumes the basic position represented in FIGS. 9 and 11, which is achieved in that the rubber-elastic diaphragm 30 is pulled in the direction toward the flat surface by the force of the vacuum, which causes the pin-like indicator element 23 fastened thereon to also being pulled downward. In this basic position 24, the pin-like indicator element 23 is retracted into the pin opening 29 and is not visible.

In case of vacuum loss, the rubber-elastic diaphragm 30 moves upward, and in the process pushes the pin-like indicator element 23 some distance out of the pin opening 29. The pin-like indicator element 23 extends clearly visible past the top of the suction head housing 16. It has assumed its loss/danger indicator position 25. If desired, the upper section of the pin-like indicator element 23 can here also be marked in color, in particular in red. In an alternative embodiment, not represented, the diaphragm 30 itself can be used as indicator element, provided it is directly visible and that in this case a possibly bead-like extension of the diaphragm, which can be provided with a caution marking, is moved into a clearly visible loss/danger indicator position 25.

The arrangement and mode of functioning of the indicator element of the suction head arranged on the other handle end are again identical.

Finally, FIGS. 13 to 18 represent a third exemplary embodiment of the handle arrangement 11 in accordance with the invention.

Here, the actuating device 17 is designed differently in comparison with the two previously described exemplary embodiments. The actuating lever 19 is located, pivotably seated on a hinge shaft 31, eccentrically in respect to the suction head 14, namely in a position closer to the gripping rod 12. The actuating lever 19 is designed as a two-armed lever, in which the first, relatively long lever arm 32 is designed for being handled by the user, while the second lever arm 33 placed in the suction head housing 16 is connected with a push-rod 34. In turn, the push-rod 34 is pivotably connected with a wedge-shaped actuating member 35, having an inclined face 36 rising preferably in a direction away from the gripping rod 12. In a non-represented variant, this can also be a circularly arranged inclined face or inclined plane, through which travel takes place by means of a pivot movement of the actuating member. The wedge-shaped actuating member 35 furthermore also has an extension, constituting the indicator element 23. The wedge-shaped actuating member 35 is slidingly conducted on the top of the ceiling of the hollow space forming the upper closure of the hollow chamber.

Here, too, an actuating tappet 18 is provided, which at the one end is connected with the suction plate 15, passes through a passage 38 in the hollow chamber ceiling, in whose upper area a cut-through 39 is formed, through which the wedge-shaped actuating member 35 projects.

In this case the extension-like indicator element 23, the friction surface 37 of the wedge-shaped actuating member 35 and the actuating tappet 18 are part of the vacuum loss indicator device 22, as is a spring element 40, which is fastened at the front end of the wedge-shaped actuating member located opposite the extension and is supported, or pulls, at the other end at a lateral wall 41 of an actuating chamber 42, which receives the actuating lever 19. The spring element 40 can be adjusted by means of an adjustment screw 45, for example it is possible to set the resilient force of the spring element 40.

For attaching the handle arrangement 11 by suction on a flat surface, the first lever arm 32 of the actuating lever is pivoted in a counter-clockwise direction (provided the left suction head is involved), and is pushed downward. In the process, the second lever arm 13 also pivots in a counter-clockwise direction in a direction toward the lateral wall 41 and pulls the push-rod 34 also in the direction of the lateral wall in the process. This movement takes place counter to the resilient force of the spring element 40. In the process, the wedge-shaped actuating member, which is hinged on the push-rod 34, is also linearly displaced toward the lateral wall 41, i.e. in the direction toward the gripping rod 12, because of which the inclined face 36 slides along the cut-through 39 of the actuating tappet 18. Since the inclined face 36 rises away from the gripping rod 12, this causes the actuating tappet 18 and the suction plate 15 to be pulled upward, because of which a vacuum is created. Now the interior wall of the cut-through 39 rests against the friction surface 37, namely against one end of the friction surface 37 facing the extension-like indicator element 23. If required, a protrusion can be provided at this end, so that the wedge-shaped actuating member 35 does not come out of engagement with the cut-through 39 of the actuating tappet 18.

Figure 13:
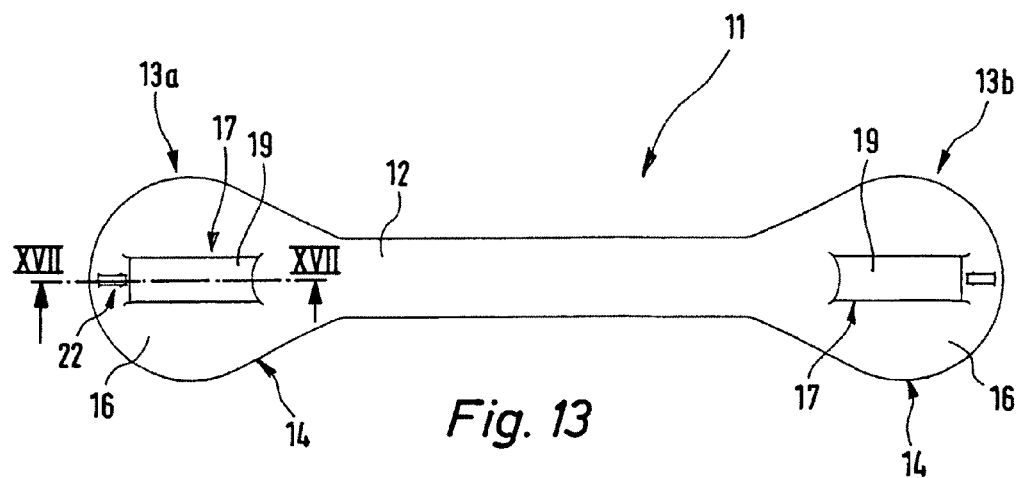
Figure 15:
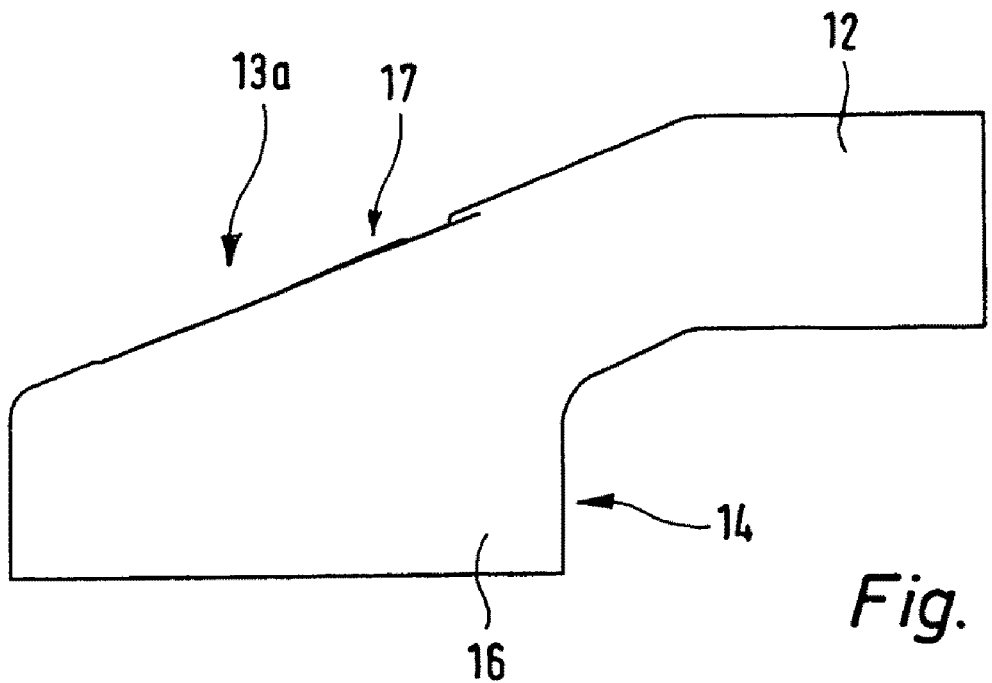
Figure 16:
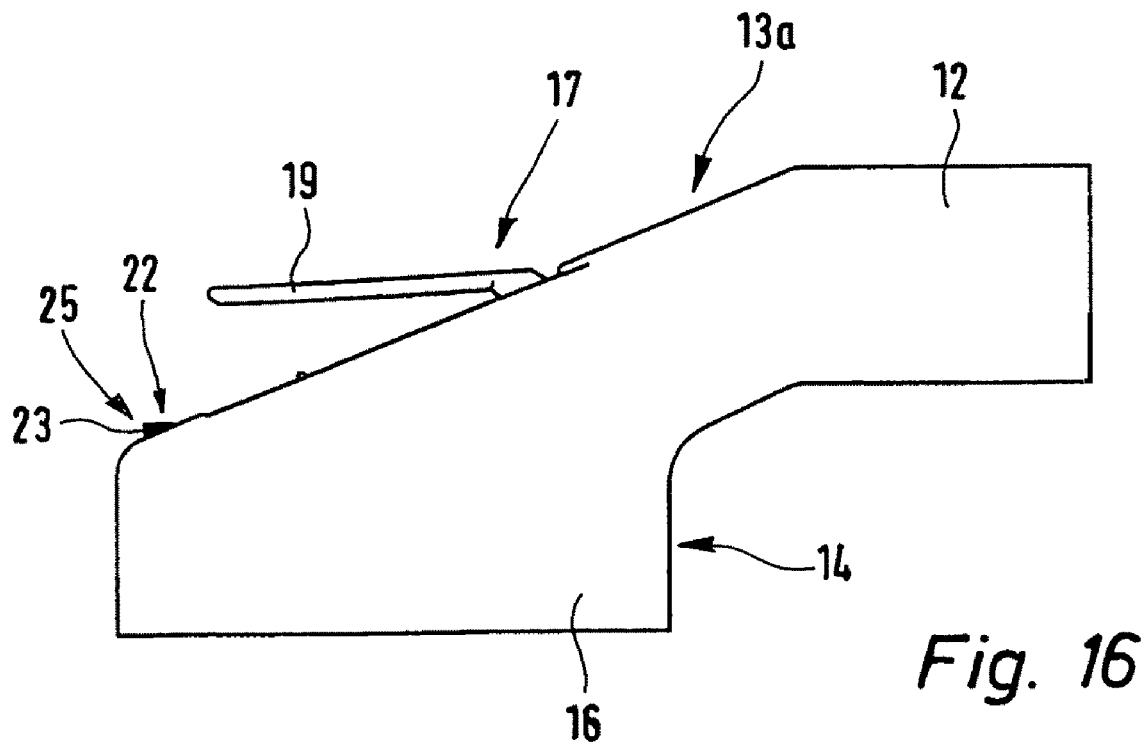
Figure 17:
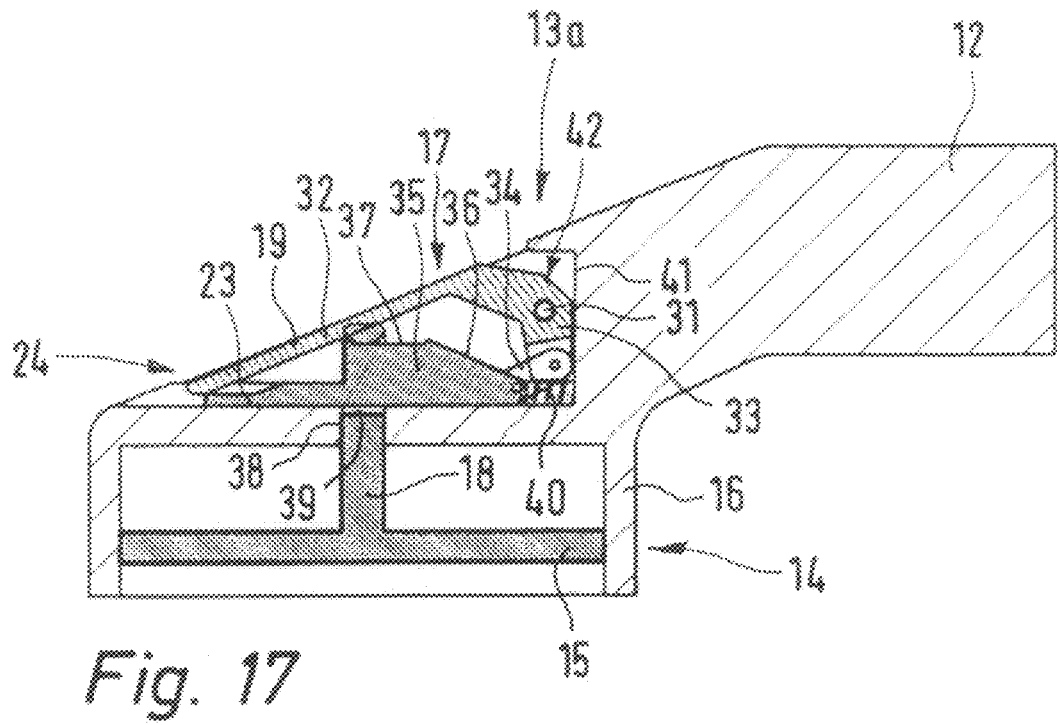
Figure 18:
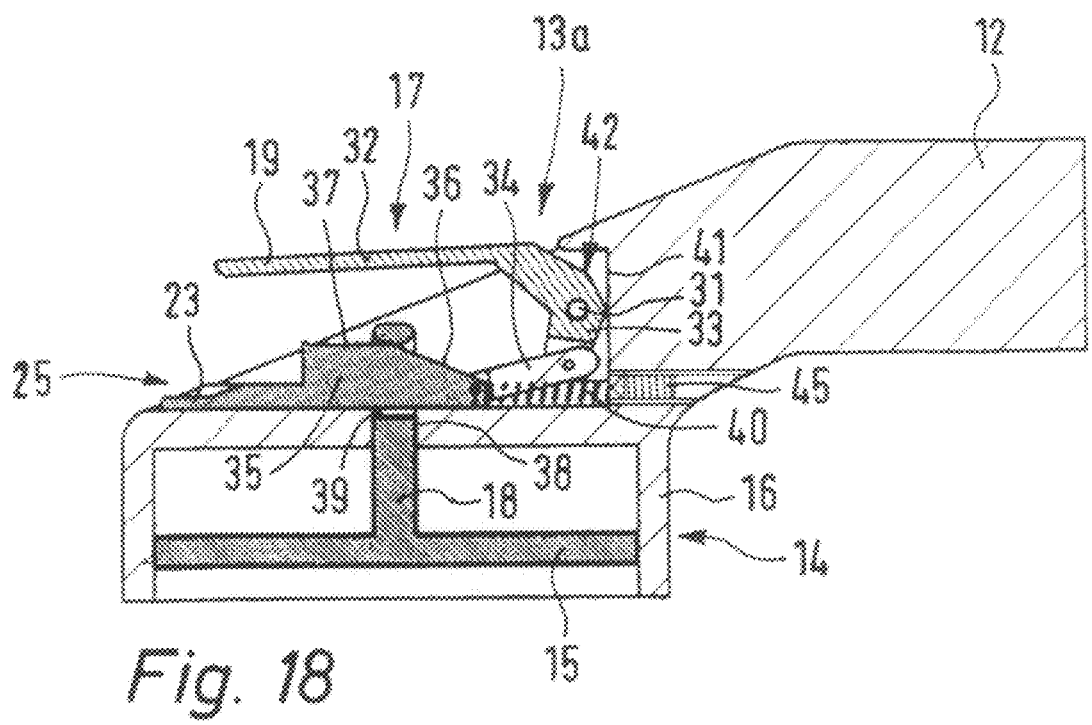

With a sufficient vacuum, the situation represented in FIGS. 13, 15 and 17 arises. In the process, because of the vacuum force acting in the direction toward the flat surface, the interior wall of the cut-through 39 of the actuating tappet 18 is pressed against the friction surface 37 of the wedge-shaped actuation member 35. Static friction is generated between the interior wall of the cut-through 39, which cannot be overcome by the resilient force of the spring element 40. Here, the extension-like indicator element 23 is lowered into the actuation chamber 42 in its basic position 24 and is not visible.

In the course of the reduction of the vacuum, the pressing force provided between the interior wall of the cut-through 39 and the friction surface 37 is reduced, so that the static friction between these two components is overcome as a result of the resilient force of the spring element 40. Because of this, the wedge-shaped actuating member 35 is pushed outward away from the gripping rod 12 until the interior wall of the cut-through 39 comes to rest against the front end of the friction surface 37. If required, a protrusion can also be provided here, which prevents a further movement of the wedge-shaped actuating member 35. At the same time, the extension-like indicator element 23 is also pushed outward away from the gripping rod, for example longitudinally or crosswise to the longitudinal axis of the handle arrangement, in the course of which it assumes its caution marking indicator position 25. It therefore protrudes out of the actuating chamber 42. If required, a red caution marking and/or a green OK-zone can be provided there. By means of the movement of the wedge-shaped actuating member 35, a movement of the actuating lever 19 in a clockwise direction is generated via the push-rod 34, because of which the first lever arm 32 again protrudes for a short distance out of the actuating chamber 42. This is then an additional caution indicator that volume loss has occurred.

Figure 19:
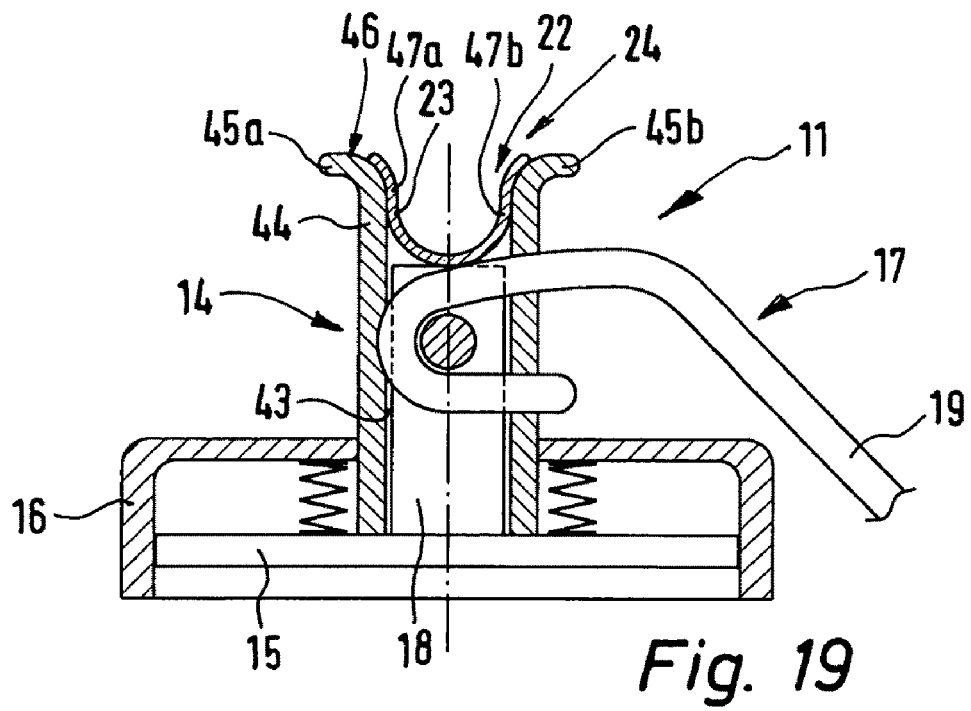
Figure 20:
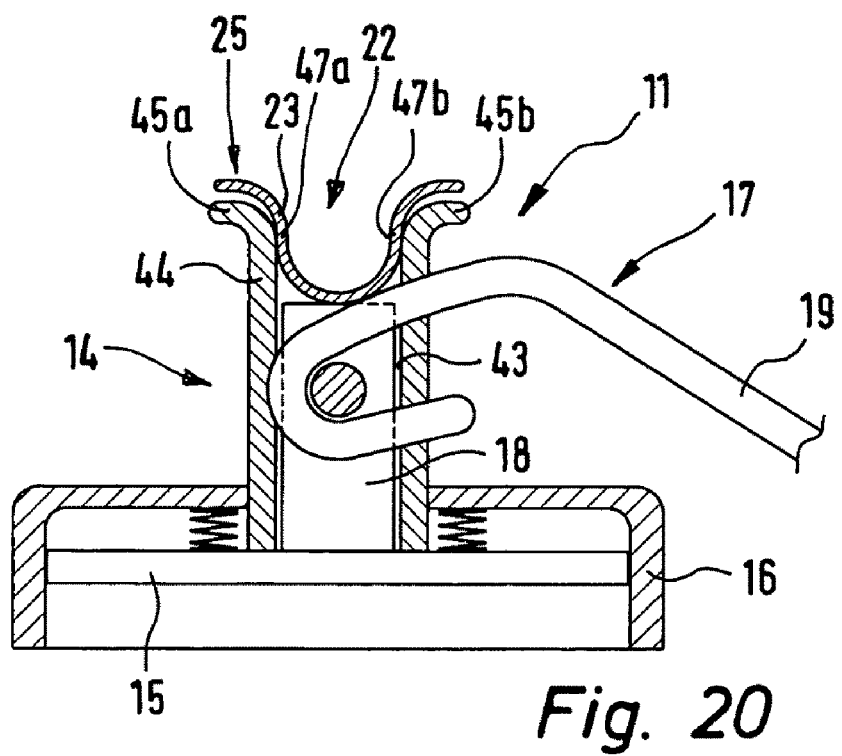

FIGS. 19 and 20 show a third exemplary embodiment of the handle arrangement 11 in a schematic representation.

Here, too, an actuating tappet 18 is provided, which at one end is connected with the suction plate 15 and passes through a passage 38 in the hollow chamber ceiling. The actuating tappet 18 extends into an actuating chamber 43 formed by a hollow-shaped housing section 44 of the suction head housing 16. It is alternatively or additionally possible for the actuating tappet 18 to also extend into the actuating chamber 42 of the third exemplary embodiment. On its top, facing away from the suction plate 15, the housing section 44 can have two edge sections 45a, 45b, each bent over toward the outside, and a marking 45 is provided at the top of the edge sections 45a, 45b, which indicates that a sufficient vacuum exists. To this end, the marking 45 can be in green, for example. However, other marking colors are also conceivable, which unequivocally indicate that a sufficient vacuum is available.

The indicator element 23 is seated in the actuating chamber 43 above the actuating tappet 18 where, in accordance with FIG. 19, it initially remains in its basic position lowered into the actuation chamber if there is a sufficient vacuum. The indicator element 23 is here represented by way of example in the form of a prestressed profiled element, for example an elongated U-shaped profile, made of a material which is flexibly bendable. The two legs 47a, 47b of the profile element are prevented from spreading away from each other, or from folding open, by the walls of the hollow-shaped housing section.

The situation in which a vacuum loss has occurred is represented in FIG. 20. In this case the actuating tappet presses the profile-like indicator element 23 upward, so that the two legs 47a, 47b are suddenly spread away from each other in a butterfly-like manner and in the course of this cover the possibly green OK-marking 46 at the top of the edge sections 45a, 45b of the housing section. Caution markings, possibly in red or red-orange color, are located on each of the tops of the respective legs 47a, 47b of the profile, which indicate that a vacuum loss has occurred.

The above described exemplary embodiments are distinguished in that, prior to reaching a no longer sufficient holding force, i.e. with the vacuum safety reserve used up, the indicator elements leave their basic position suddenly, rapidly and clearly, or in that the up to that time creeping vacuum loss suddenly changes in such a way that it becomes effective as a signal in optical form, shape, feel and/or combined with acoustics. The vacuum loss is thus immediately signaled, so that a lack of awareness can be avoided, which can occur in connection with a so-called "creeping" indication of the vacuum loss, for example in that the signal color slowly changes from green to red.

Figure 14:
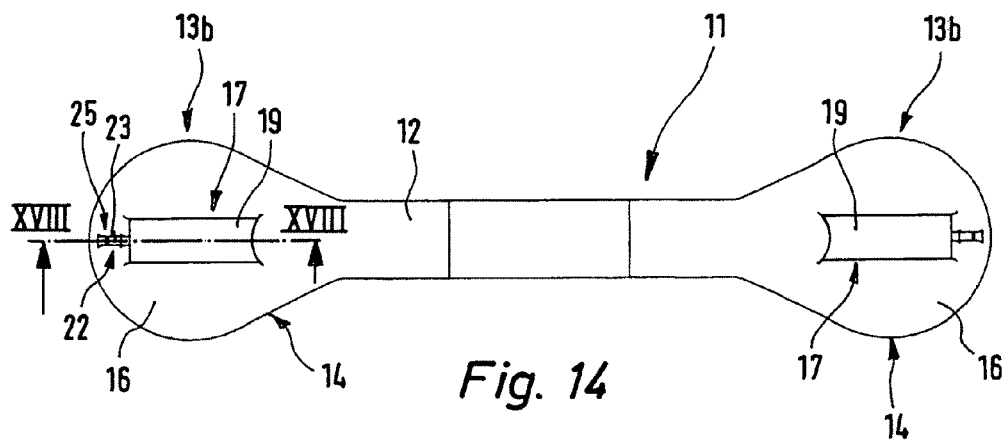

The third exemplary embodiment represented in FIGS. 19 and 20 can also be integrated into the second exemplary embodiment represented in FIGS. 13 to 18, in which case the suction heads can each have two indicator elements 23, which can be actuated independently of each other. Here, the profile-shaped indicator element 23 could for example be arranged above the actuating tappet 18, in which case the U-profile-like indicator element 23 can extend below the first lever arm of the actuating lever 19 and, in the loss indication position, can project past the width of the first lever arm (FIG. 14, dash-dotted lines). Since the actuating tappet 18 can also be located in the actuating chamber 42, it is possible that in addition the profile-like indicator element extends, possibly also in the same direction, for example horizontally, toward the extension-like indicator element.

Figure 21:
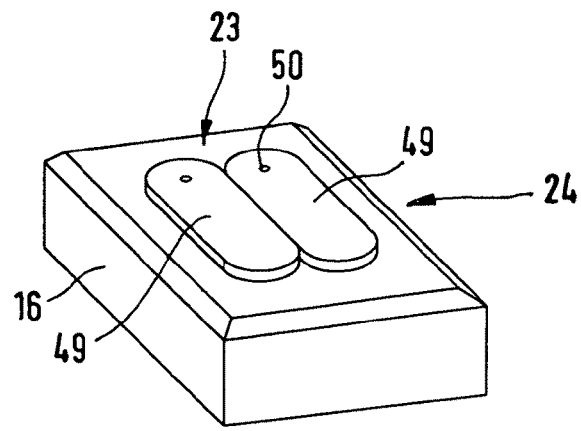
Figure 22:
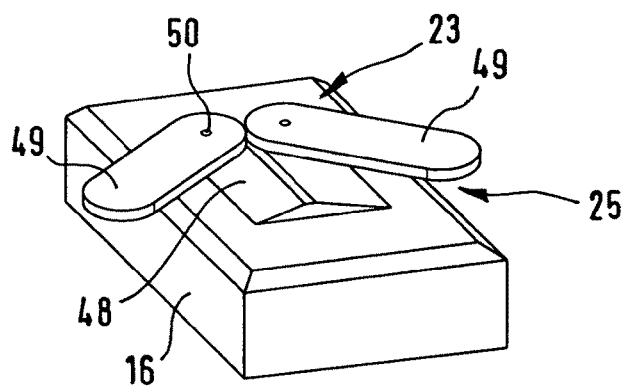

FIGS. 21 and 22 represent an embodiment of the indicator element 23. The indicator element 23 is located on a base body, for example on the suction head housing 16. For the sake of simplicity, the base body is represented in a cube shape but, as mentioned, can be constituted by the suction head housing 16 or the actuating lever or other peripheral components of the handle arrangement 11. The indicator element 23 has an actuating body 48 which, if desired, is coupled directly or via a coupling member with the actuating tappet 18. In the basic position of the indicator element 23 represented in FIG. 23, the actuating body 48 is obscured by at least one actuating member 49. In accordance with the embodiment represented in FIG. 23, two actuating members 49 in the shape of pivoting wings are shown, which completely cover the top of the actuating body 48 in the basic position 24 of the indicator element 23 represented in FIG. 23.

In case of a loss of vacuum, the actuating body 48 is pushed upward out of a recess, in which case the actuating body 48 simultaneously pivots the pivoting wings, each of which is seated on a pivot shaft 50, outward in a butterfly-like manner, i.e. away from each other. A marking, for example in the color red, possibly aided by a logo, is located on the top of the actuating body 48, which signals that the vacuum is no longer effective, i.e. a sufficient vacuum is no longer available. Furthermore, the pivoted-out position of the pivoting wings is a further caution indicator of an insufficient vacuum. This additional caution indicator acts visually, i.e. the position of the pivoting wings has changed by touch as well, i.e. the position can also be sensed by touch, if desired. This additional caution indicator, clearly visible and possibly also recognizable by touch, is of advantage particularly if the light in the surroundings of the handle arrangement 11 affixed to the wall is diffuse, or when the handle arrangement is used by visually-handicapped persons.

Figure 23:
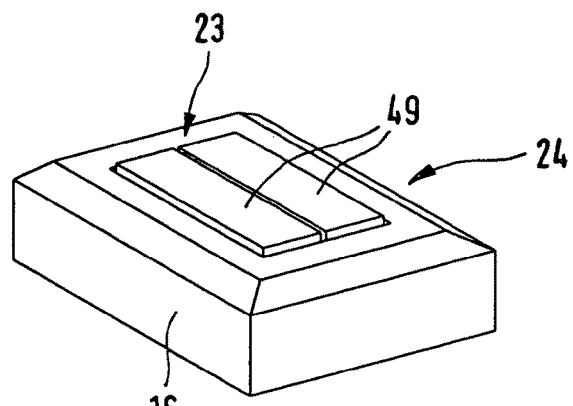
Figure 24:
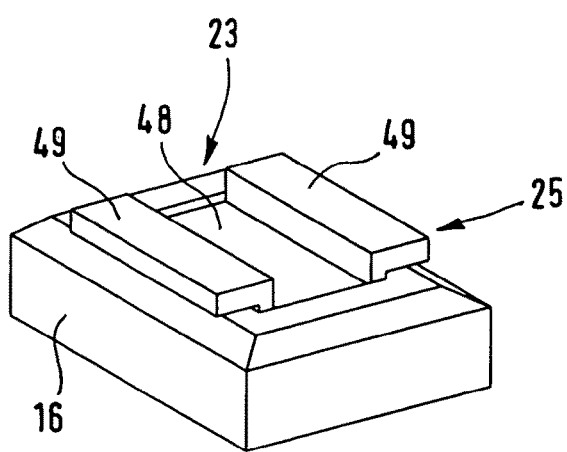

FIGS. 23 and 24 show a further embodiment of the indicator element 23. Again the indicator element 23 is seated on a base body, which for example can be constituted by the suction head housing 16 or the actuating lever 19. Here, too, an actuating body 24 is provided which, in the basic position represented in FIG. 23, is completely obscured by two actuating members 49. Here, two actuating strips, which can be linearly displaced toward the outside, are provided as actuating members 49. In case of a loss of vacuum, the actuating body 48 is again pushed upward, in the course of which it moves the two actuating strips away from each other toward the outside. In this state the indicator element 23 is in its loss-indicating position. A caution marker, for example in red color, is located on the top of the actuating body, which shows that a vacuum loss has occurred. Again, an additional, clearly visible and possibly recognizable by touch, caution indicator of vacuum loss is made available by means of the outward moved actuating strips.

Figure 25:
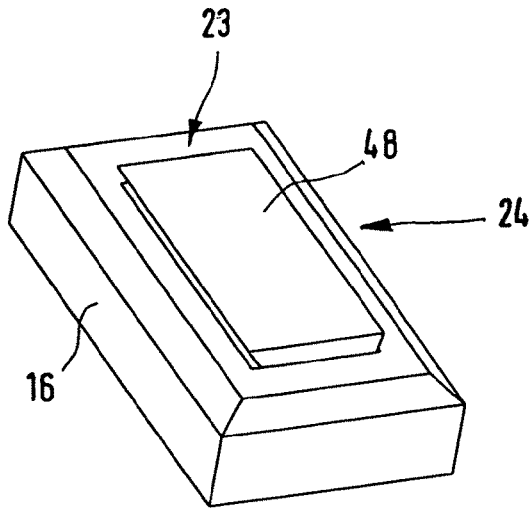
Figure 26:
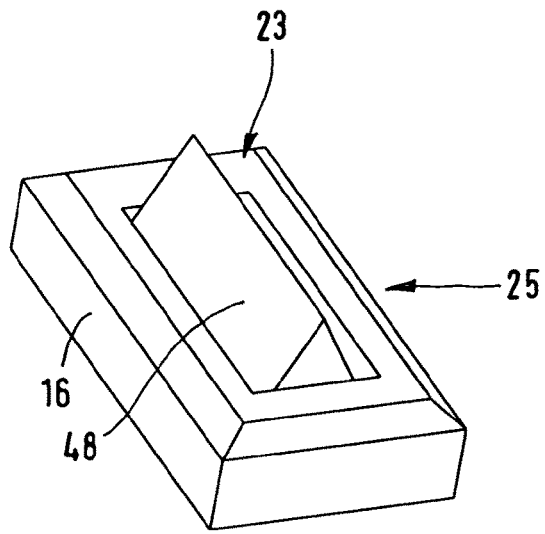

FIGS. 25 and 26 show a further embodiment of the indicator element 23, which is also housed in a base body, for example the suction head housing 16 or the actuating lever 19. In contrast to the previously described embodiments, the indicator element 23 has an actuating body 48, but no actuating member, and in the basic position of indicator element 23 represented in FIG. 25, the actuating body is provided on its top with a marking indicating a sufficient vacuum. A green OK-marking, for example, is suitable for this. If a vacuum loss now occurs, the actuating body tips over in its receiving opening, so that a portion of the actuating body comes out of the receiving opening. A possibly red caution marking appears. The outward projecting tip of the actuating body moreover represents an additional, clearly visible and possibly recognizable by touch, caution indicator of a vacuum loss.

Figure 27:
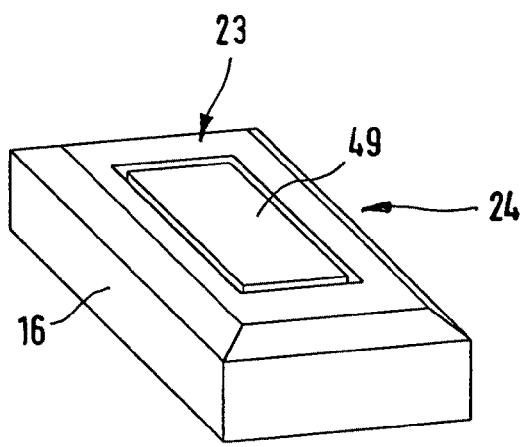
Figure 28:
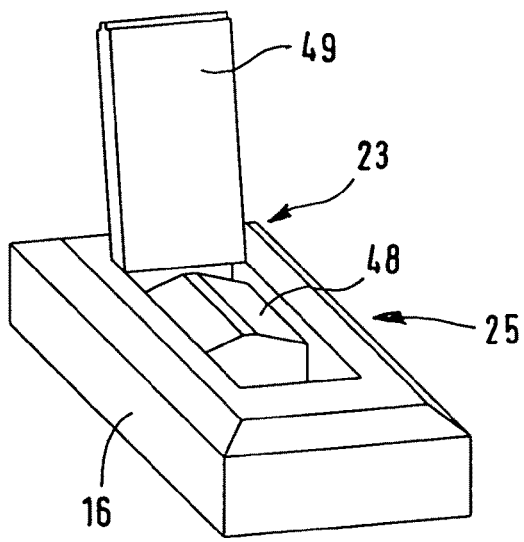

Finally, FIGS. 27 and 28 show a further embodiment of the indicator element 23, which is again housed in a base body, for example the suction head housing 16 or the actuating lever 19. The indicator element 23 has an actuating body 48 which, in the basic position of the actuating element 23 represented in FIG. 27, is completely obscured by an actuating member 49 in the form of a tilt element. In case of a vacuum loss, the actuating body 48 is pushed upward, in the course of which it acts on the tilt element, which then flips open. In this way the loss indicator position 25 of the indicator element 23 represented in FIG. 28 is achieved as an effective signal. Again, a possibly red caution marking is located on the top of the actuating body 48, while the flipped-open actuating member 49 projecting upward away from the base body again represents an additional, clearly visible and possibly recognizable by touch, caution indicator of a vacuum loss.

In connection with the embodiments represented in FIGS. 21 to 28, the indicator element 23 is suddenly moved from its basic position 24 into the loss-indicating position in case of a vacuum loss. Thus, a dependable and clearly noticeable, possibly recognizable by touch, indication of a vacuum loss is made available.

The invention claimed is:

1. A handle arrangement having a gripping rod (12), on which at least one suction head (14) with a suction plate (15) or a suction piston (50) and an actuating device (17) for the suction plate (15), or respectively suction piston (50), are arranged on at least one handle end (13a, 13b), or between both handle ends (13a, 13b), the at least one suction head (14) can be attached by suction to a porous surface by activating the actuating device (17) for forming a vacuum acting between the porous surface and the suction plate (15), or respectively the suction piston (50), and released therefrom by releasing the vacuum, characterized in that a vacuum loss indicator device (22), which reacts to the reduction of the vacuum, is provided, the vacuum loss indicator device (22) has at least one indicator element (23), in particular mechanically actuable which, by means of a change in the vacuum, can be moved between a position (24) corresponding to a vacuum for the desired holding force of the handle arrangement (11), and at least one loss indicator position (25) signaling a reduction of the vacuum, a bolt is connected at one end with the suction plate (15) or the suction piston (50) and on the other end with the indicator element (23), and a spring element (28, 40) is coupled with the indicator element (23), whose spring force acts counter to the vacuum force exerted by the vacuum in the direction of the flat surface and the indicator element (11) and the bolt are movable relatively to each other and are held against each other by static friction generated by the vacuum force, so that, when the vacuum is reduced, the static friction can be overcome by means of the resilient force of the spring element (40) acting perpendicularly to the direction of the vacuum force, so that the indicator element takes up (23) its loss indicator position (25).

2. The handle arrangement in accordance with claim 1, characterized in that the indicator element (23) in its position (24) is housed in the suction head (14) so that it is not visible.

3. The handle arrangement in accordance with claim 1, characterized in that, in the loss indicator position (25), the indicator element (23) has a visible colored caution marking and/or designated by at least a logo or writing, as an additional indicator of a vacuum loss.

4. The handle arrangement in accordance with claim 1, characterized in that when the safety reserve regarding the vacuum is used up, the indicator element can be moved, without lingering in an intermediate position, from its position (24), or from a creeping change indication into a loss indication end position.

5. The handle arrangement in accordance with claim 1, characterized in that, in its loss indicator position (25), the indicator element (23) takes up a position which is exposed in respect to the handle periphery, is visible and can be found by touch.

6. The handle arrangement in accordance with claim 1, characterized in that a coupling means is provided for coupling the indicator element (23) with the suction plate (15) or the suction piston (50).

7. The handle arrangement in accordance with claim 6, characterized in that the coupling means has a diaphragm (30) fastened on the suction plate (15) or the suction piston (50) and is movable by a change in the vacuum.

8. The handle arrangement in accordance with claim 1, characterized in that the indicator element (23) and the bolt are relatively immovably connected with each other and, when the vacuum is decreased, the suction plate (15) or the suction piston (50), the bolt and the indicator element (23) can be lifted by the resilient force of the spring of the spring element (28) in a direction away from the flat surface, so that the indicator element attains its loss indicator position (25).

9. The handle arrangement in accordance with claim 1, characterized in that the actuating device (17) has an actuating tappet (18) fastened to the suction plate (15) or to the suction piston (50), which is connected via a hinged shaft (20, 31) with an eccentrically designed actuating lever (19), which can be pivoted between an opening position and a closing position, so that, based on the eccentricity of the actuating lever (19), in the closing position the actuating tappet (18) and the suction plate (15) are lifted off the level surface, so that a vacuum is thus created.

10. The handle arrangement in accordance with claim 1, characterized in that respectively at least one suction head (14) is seated at both grip ends (13a, 13b).

11. The handle arrangement in accordance with claim 1, characterized in that several suction heads (14) are lined up one behind the other on the gripping rod (12) in a railing arrangement.

12. The handle arrangement in accordance with claim 1, characterized in that at least one indicator element (23) of the vacuum loss indicator device (22) is assigned to each suction head (14).

13. A handle arrangement having a gripping rod (12), on which at least one suction head (14) with a suction plate (15) or a suction piston (50) and an actuating device (17) for the suction plate (15), or respectively suction piston (50), are arranged on at least one handle end (13a, 13b), or between both handle ends (13a, 13b), the at least one suction head (14) can be attached by suction to a porous surface by activating the actuating device (17) for forming a vacuum acting between the porous surface and the suction plate (15), or respectively the suction piston (50), and released therefrom by releasing the vacuum, characterized in that a vacuum loss indicator device (22), which reacts to the reduction of the vacuum, is provided, the vacuum loss indicator device (22) has at least one indicator element (23), in particular mechanically actuable which, by means of a change in the vacuum, can be moved between a position (24) corresponding to a vacuum for the desired holding force of the handle arrangement (11), and at least one loss indicator position (25) signaling a reduction of the vacuum, the indicator element (23) in its basic position (24) is housed in the suction head (14) so that it is not visible and, in case of the safety reserve regarding the vacuum being used up, the indicator element can be moved, without lingering in an intermediate position, from its basic position (24), or from an up to then creeping change indication, into a loss indication end position.

* * * * *